(12) United States Patent
Xiong et al.

(10) Patent No.: US 8,869,190 B2
(45) Date of Patent: *Oct. 21, 2014

(54) ENABLEMENT OF PREMIUM CONTENT FOR INTERNET VIDEO CLIENT

(71) Applicant: Sony Corporation, Tokyo (JP)

(72) Inventors: True Xiong, San Diego, CA (US); Charles David McCoy, San Diego, CA (US); Viral Mehta, San Diego, CA (US); Leo Pedlow, Ramona, CA (US); Aran Sadja, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/055,631

(22) Filed: Oct. 16, 2013

(65) Prior Publication Data

US 2014/0047469 A1    Feb. 13, 2014

Related U.S. Application Data

(63) Continuation of application No. 12/844,312, filed on Jul. 27, 2010, now Pat. No. 8,607,263.

(60) Provisional application No. 61/330,993, filed on May 4, 2010, provisional application No. 61/331,092, filed on May 4, 2010.

(51) Int. Cl.
| | |
|---|---|
| *H04N 7/16* | (2011.01) |
| *H04N 21/61* | (2011.01) |
| *H04N 21/441* | (2011.01) |
| *H04N 21/8352* | (2011.01) |
| *H04N 21/4627* | (2011.01) |
| *H04N 21/858* | (2011.01) |
| *H04N 21/472* | (2011.01) |
| *H04L 29/06* | (2006.01) |

(52) U.S. Cl.
CPC .......... *H04N 21/8352* (2013.01); *H04L 63/166* (2013.01); *H04N 21/6175* (2013.01); *H04L 63/101* (2013.01); *H04N 21/441* (2013.01); *H04N 21/4627* (2013.01); *H04L 63/0807* (2013.01); *H04N 21/8586* (2013.01); *H04L 63/0823* (2013.01); *H04L 63/0869* (2013.01); *H04N 21/47211* (2013.01)
USPC ........................................................ 725/25

(58) Field of Classification Search
USPC ......................................................... 725/25
See application file for complete search history.

(56) References Cited

U.S. PATENT DOCUMENTS

| | | | |
|---|---|---|---|
| 6,374,402 B1 * | 4/2002 | Schmeidler et al. .......... | 717/167 |
| 7,600,245 B2 * | 10/2009 | Steading et al. ................ | 725/52 |
| 7,836,493 B2 * | 11/2010 | Xia et al. ........................... | 726/9 |
| 2003/0078842 A1 * | 4/2003 | Scholten et al. ................ | 705/14 |
| 2005/0086683 A1 * | 4/2005 | Meyerson ........................ | 725/30 |
| 2009/0049480 A1 * | 2/2009 | Wang et al. ..................... | 725/46 |

* cited by examiner

*Primary Examiner* — Olugbenga Idowu
(74) *Attorney, Agent, or Firm* — John L. Rogitz (57) ABSTRACT

A device is enabled to display Internet TV by accessing a management server and receiving back from the server a user token and a service list of predefined content servers. A user can select a content server on the service list which causes the device to upload its user token to the management server, which in turn sends back the network path to the content server along with a content server-user-unique service token (SUIT) that the device uses to access the content on the content server, in some embodiments on per-title PPV access, per-content category PPV access, or per-service PPV access.

14 Claims, 5 Drawing Sheets

FIG.3
REGISTRATION

FIG. 4
REGISTRATION (CON'T.)

FIG. 5
MANAGEMENT SERVER LOGIC

FIG. 6
PROXY LOGIC

FIG. 7
CLIENT LOGIC
POST REGISTRATION

ENABLEMENT OF PREMIUM CONTENT FOR INTERNET VIDEO CLIENT

This application claims priority from U.S. provisional applications Nos. 61/330,993 and 61/331,092, both filed May 4, 2010.

FIELD OF THE INVENTION

The present application relates generally to providing pay per view content for Internet video clients including but not limited to TVs.

BACKGROUND OF THE INVENTION

Internet access through TVs is typically provided by essentially programming the TV as though it were a computer executing a browser. Such Internet access is thus uncontrolled except as a firewall or filtering program might block certain sites.

As understood herein, uncontrolled Internet access may not be desirable in the context of a TV. A firewall or filtering program may not always be installed on the TV and even when one is installed, access remains much more uncontrolled than conventional TV programming traditionally has expected. Also, a locally installed filter can be unloaded or defeated by a user.

Accordingly, uncontrolled Internet access has several drawbacks. From a viewer's standpoint, exposure to inappropriate subject matter particularly when young viewers are watching is one concern; a much lower threshold of quality screening is another. That is, while many TV shows might not be widely considered as "quality" shows, nonetheless a TV program is usually much more selectively screened than, say, an Internet video. The expectations of TV viewers for such higher level quality screening as a consequence cannot be met by simply providing unfettered Internet access through the TV. Furthermore, TV-related entities, from content providers, manufacturers, and carriers, in most cases derive no benefit from the extension of TV to the Internet, such as, e.g., might be derived, as understood herein, by pay-per-view based on one or more options.

SUMMARY OF THE INVENTION

Accordingly, a content server assembly has at least one processor, at least one network interface communicating with the processor to establish communication between the processor and a wide area network, and at least one computer readable storage medium accessible to the processor and bearing logic causing the processor to provide a respective client-unique service user identification token (SUIT) to a management server for each of plural user accounts identified by the management server. The processor receives from a client device accessing the content server assembly over a network path obtained by the client device from the management server at least a request for a content list and the SUIT. Also, the processor determines whether the SUIT is valid and responsive to a determination that the SUIT is valid and only if the SUIT is valid, provides a content list to the client device.

In some embodiments the content server assembly can include a content server and a proxy server communicating with the content server and interfacing the content server with the client device. An access type indicator in the proxy server, such as a three-value software flag, may indicate that the client device is authorized to access individual content asset titles.

If desired, the content server assembly can receive a request for a content list and information pertaining thereto and transmit the content list to the client device only if both the SUIT and a user token received from the client device are valid. The user token can be originated by a management server to indicate that the client device is properly enrolled with the management server. In response to the request for a content list and a determination that the user token indicates that the client device is properly enrolled, the content server assembly can use the SUIT to ascertain an account of the client device. Token validity may be executed by verifying that the token appears in a table of authorized tokens accessible to the content server assembly. The content server assembly may receive a copy of the user token from the management server and may transmit a user interface (UI) form to the client device usable for generating billing information to the account of the client device responsive to receiving a selection of content from the client device. The content list can present pay per view (PPV) entries, with each entry representing an individual content asset title available for purchase by the client device.

In another aspect, a consumer electronic (CE) device includes a housing, a display on the housing, a network interface, and a processor in the housing controlling the display and communicating with the Internet through the network interface. The processor executes logic that includes receiving from a management server a service list and user token. The service list has entries corresponding to content server assemblies. The logic also includes receiving from the input device a selection of an entry on the list and responsive to the selection sending the user token and selection to the management server. The processor receives from the management server a network path corresponding to the entry on the list that was selected along with a service user identification token (SUIT) and responsive to receiving the network path and SUIT, establishes communication with the content server assembly using the network path. The processor provides to the content server assembly the SUIT and a request for a content listing.

In yet another aspect, a management server has a processor, network interface communicating with the processor to establish communication between the processor and a wide area network, and a computer readable storage medium accessible to the processor and bearing logic causing the processor to receive from a content server assembly a service user identification token (SUIT) unique to a client account associated with at least one client device. The processor receives from the client device a selection of the content server assembly from a service list provided by the management server to the client device and also receives from the client device a user token. The processor then determines whether the user token is valid and only if the user token is valid, sends to the client device a network path to the content server assembly and the SUIT.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
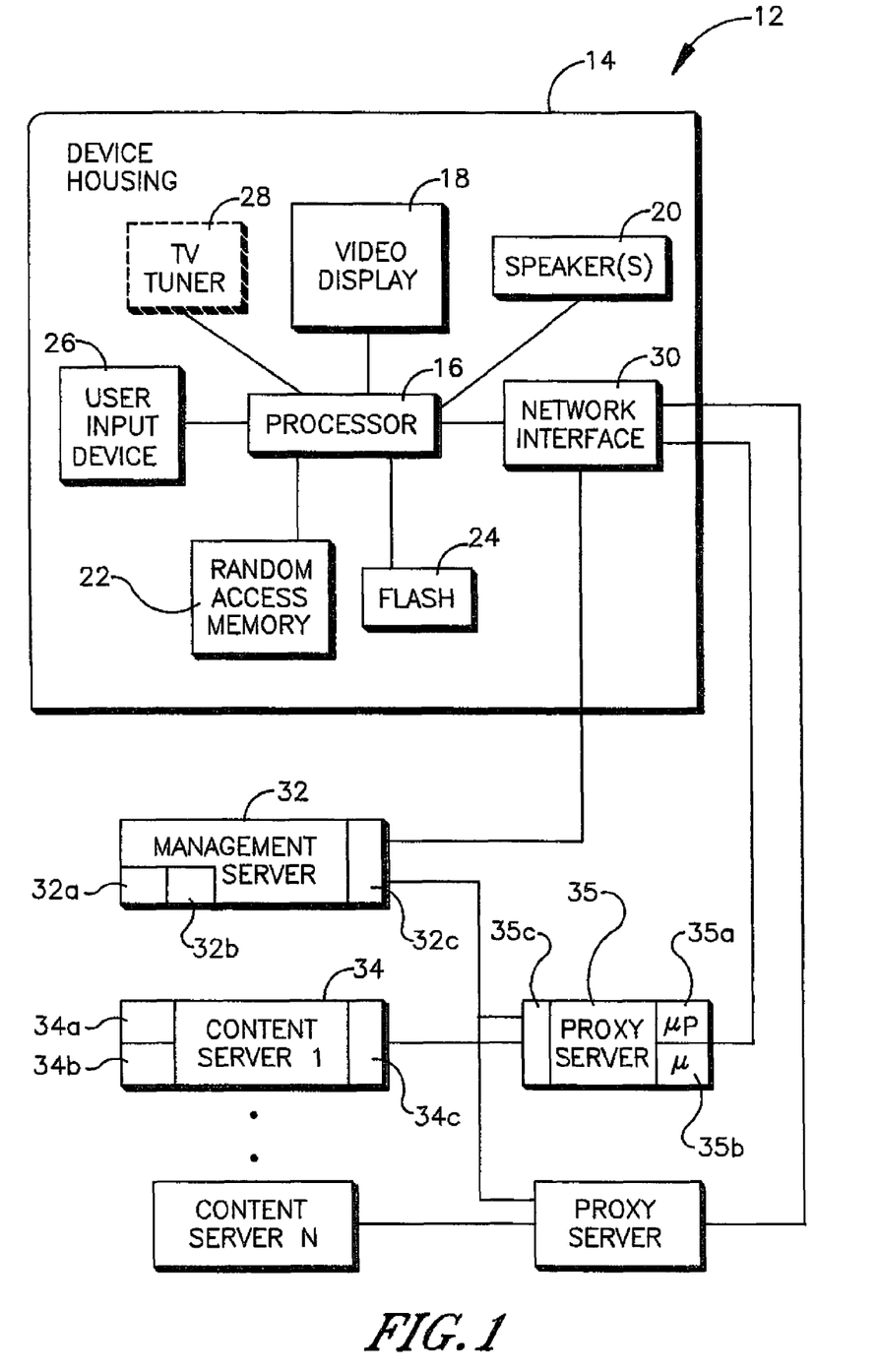
FIG. 1 is a block diagram of an example system in accordance with present principles.

Referring initially to FIG. 1, a consumer electronics (CE) device 12 such as a TV, game player, video disk player, camera, digital clock radio, mobile telephone, personal digital assistant, laptop computer, etc. includes a portable lightweight plastic housing 14 bearing a digital processor 16. The processor 16 can control a visual display 18 and an audible display 20 such as one or more speakers.

To undertake present principles, the processor 16 may access one or more computer readable storage media such as but not limited to RAM-based storage 22 (e.g., a chip implementing dynamic random access memory (DRAM)) or flash memory 24. Among other things, in example non-limiting embodiments video thumbnails may be stored on the RAM 22 while the below-described service list and tokens as well as user interface icons may be stored on the flash 24. Software code implementing present logic executable by the CE device 12 may also be stored on one of the memories shown to undertake present principles.

The processor 16 can receive user input signals from various input devices 26, including a remote control device, a point and click device such as a mouse, a keypad, etc. A TV tuner 28 may be provided in some implementations particularly when the CE device is embodied by a TV to receive TV signals from a source such as a set-top box, satellite receiver, cable head end, terrestrial TV signal antenna, etc. Signals from the tuner 28 are sent to the processor 16 for presentation on the display 18 and speakers 20.

As shown in FIG. 1, a network interface 30 such as a wired or wireless modem or wireless telephony transceiver communicates with the processor 16 to provide connectivity to a management server 32 on the Internet and to one or more content servers 34. If desired, each content server 34 may be associated with a respective proxy server 35 which interfaces the content server 34 with the device 12, it being understood that the below-described proxy server logic may be consolidated within the content server 34 and a physically separate proxy server eliminated if desired. In any case, the servers 32, 34, 35 have respective processors 32a, 34a, 35a accessing respective non-transitory computer readable storage media 32b, 34b, 35b which may be, without limitation, disk-based and/or solid state storage. The servers communicate with a wide area network such as the Internet via respective network interfaces 32c, 34c, 35c. It is to be understood in view of disclosure below that the CE device 12 particularly when implemented by a non-PC device such as a TV or game console or camera can communicate only with the management server 32 and with content servers 34 that appear on a service list provided to the processor 16 by the management server 32, with the service list not being modifiable by the processor 16.

Figure 2:
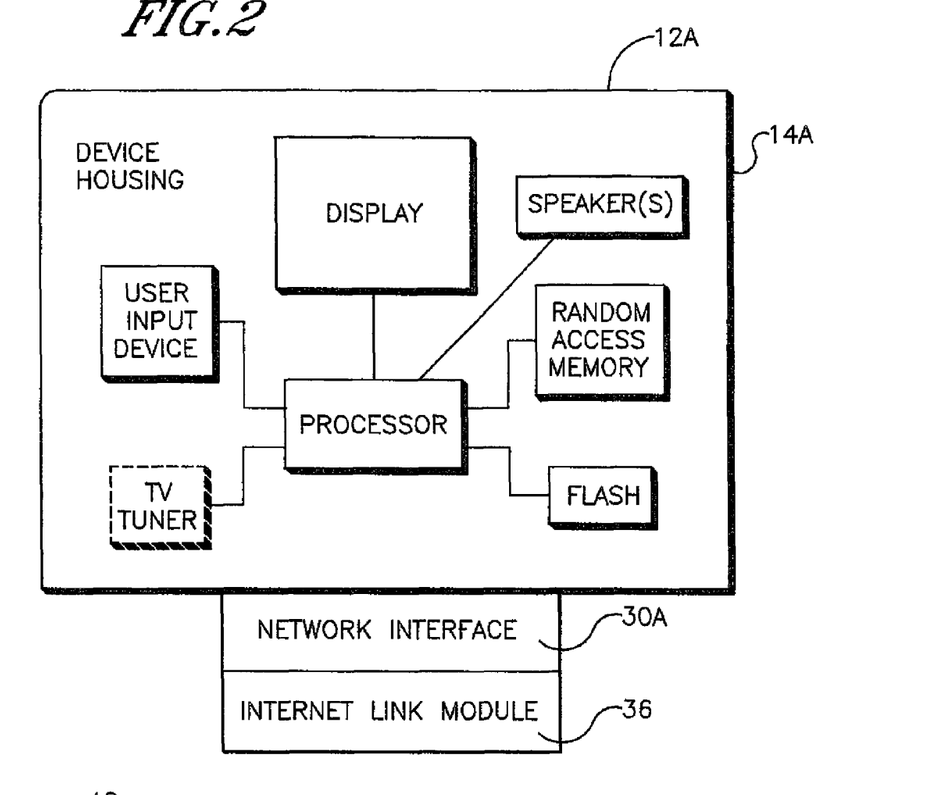
FIG. 2 is a block diagram of another example system in accordance with present principles.

FIG. 2 shows a CE device 12a that in all essential respects is identical to the device 12 shown in FIG. 1, except that a network interface 30a is not located within the device housing 14a but instead is supported in a separate Internet link module housing 36 that may be mounted on the device housing 14a.

Figure 3:
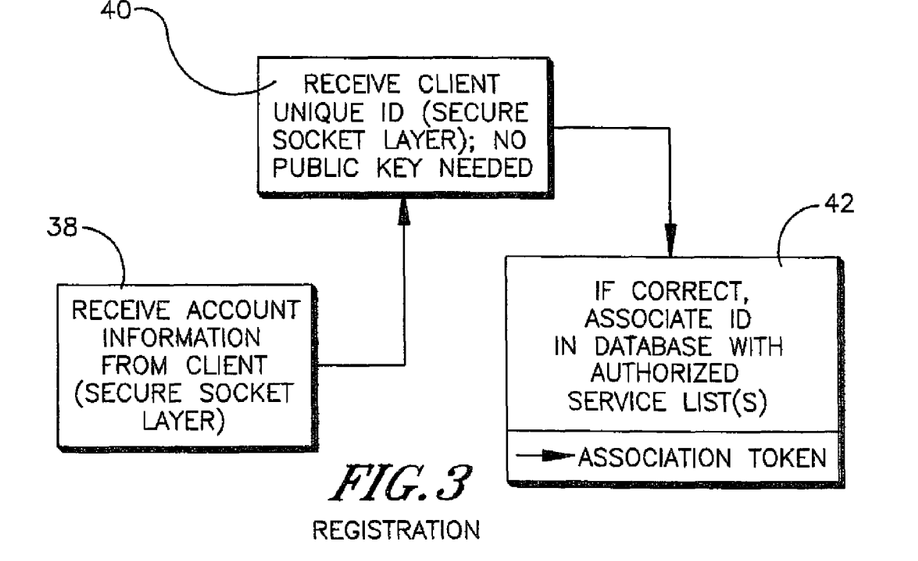
FIG. 3 is a flow chart of example registration logic according to present principles.

Now referring to FIG. 3, example registration logic can be seen. Commencing at block 38 the CE device 12 sends account information to the management server 32 preferably using a secure means of communication such as secure socket layer (SSL). Accordingly, it will be appreciated that private key-public key encryption need not be executed by the processor 16 to reduce the processing requirements thereon. The account information may include, e.g., user name and password.

At block 40, the CE device 12 sends to the management server 32 its unique identification, again using SSL so that no key encryption is required. The value of the ID can be preloaded at the factory or at client creation time and may be a unique "fingerprint" of the CE device 12, for example, a secret concatenation of its model number and serial number.

Moving to block 42, if the ID of the CE device is on an approved list of IDs it is associated by the management server in a database with one or more service lists that have been approved for the CE device 12. This in effect creates an "association token", which correlates the CE device ID with the approved service lists. A service list contains the network addresses of the content servers 34 that are approved for providing content to the CE device 12 and that typically are portal sites established by business partners of the provisioner of the Internet access logic or module discussed herein. Since the portals are established by approved providers they can be designed to contain only links to approved content as discussed below and thus can be made devoid of hyperlinks to elsewhere on the Internet.

Figure 4:
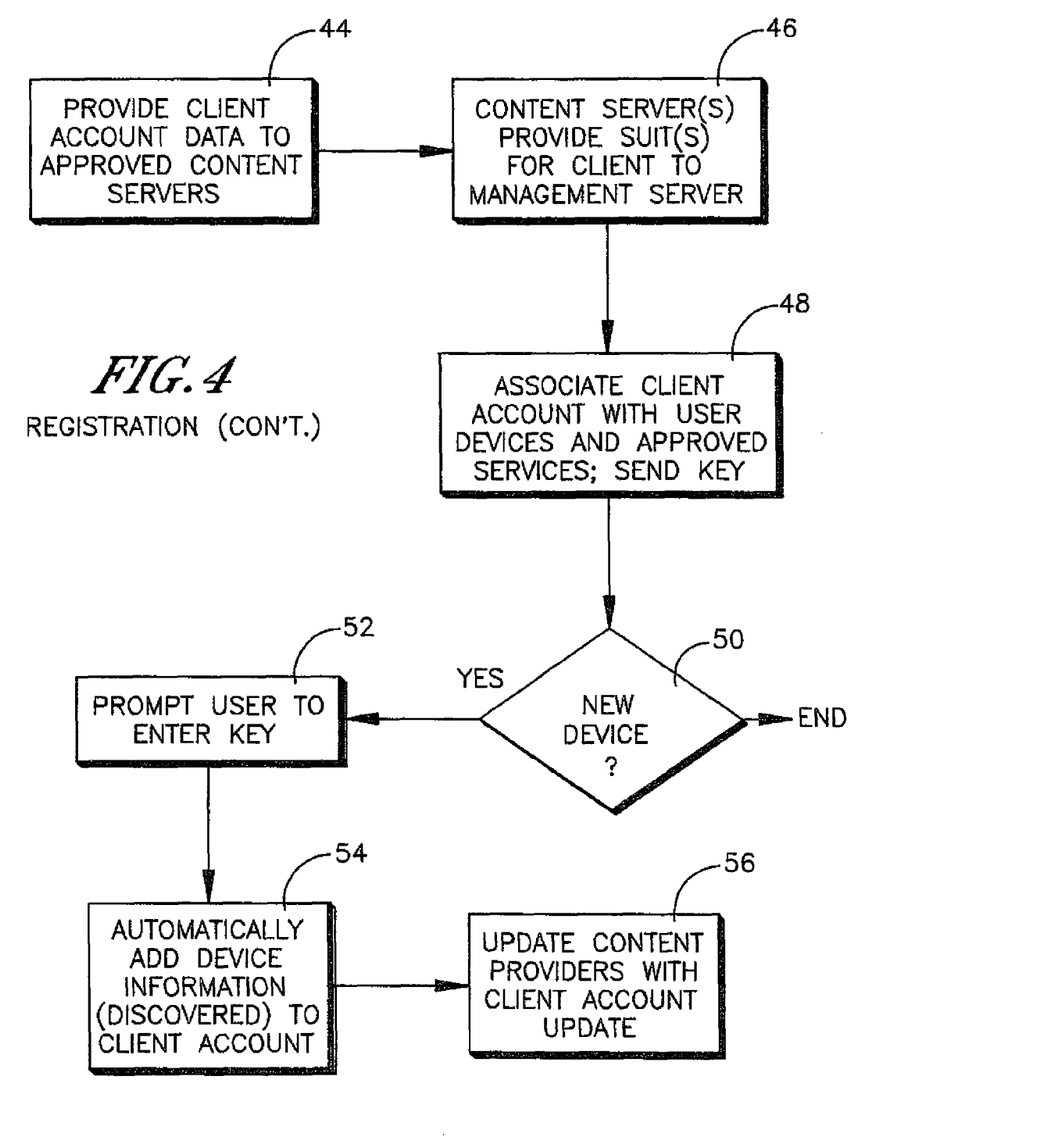
FIG. 4 is a flow chart of further example registration logic.

Now referring to FIG. 4, at block 44 the management server 32 provides account data of the client 12 to the content servers 34 (in some embodiments, with respective proxy servers 35) that have entered into a business relationship with the entity associated with the management server 32 for the purpose of providing Internet video content to the client device 12. Moving to block 46, each content server/proxy server combination provides a client-unique service user identification token (SUIT) to the management server 32. In preferred implementations a single client account is associated by each respective content server/proxy server combination with a single unique SUIT even though, as explained further below, the client account may be associated with multiple devices which may access a content server.

The logic moves from block 46 to block 48 wherein each client account is associated with one or more devices 12 and with services that are approved for that client account. Each device 12 in the client account has access to the user token and service list so that a user may access the features herein using any device registered to his account. The services which are approved for the account typically are agreed on by the entities associated with the management server and the content servers as part of the above-mentioned business relationship, and may include, e.g., "basic content only", "access premium pay-per-view (PPV) content by individual title, or by service, or by category", etc. Also, in some embodiments to facilitate easily adding a new device to the user's account, a unique key such as a four digit key is provided to the client device 12 employed by the user to access the management server.

With this feature, if the user associated with the client device purchases a new device at decision diamond 50 and chooses to add the new device to the existing account, at block 52 the management server 32 can prompt the user to enter the key provided at block 48. This prompt may occur when, for instance, the user first starts up the new device and the device is programmed to access the management server 32, with the server 32 downloading a prompt page to the new device. Upon entry of the key and after verifying at block 54 that the key is correct, the new device is added (by, e.g., entering the device serial number and if desired model number into a table of the user's account devices accessible to the management server 32) to the user's account and provided access to the service list and user token. The device information added to the account may be automatically sent by the device to the server or discovered by the server. In any case, the various content servers 34/proxy servers 35 may be provided with the updated account information at block 56 so that they to know what devices are authorized access for a particular user account.

Figure 5:
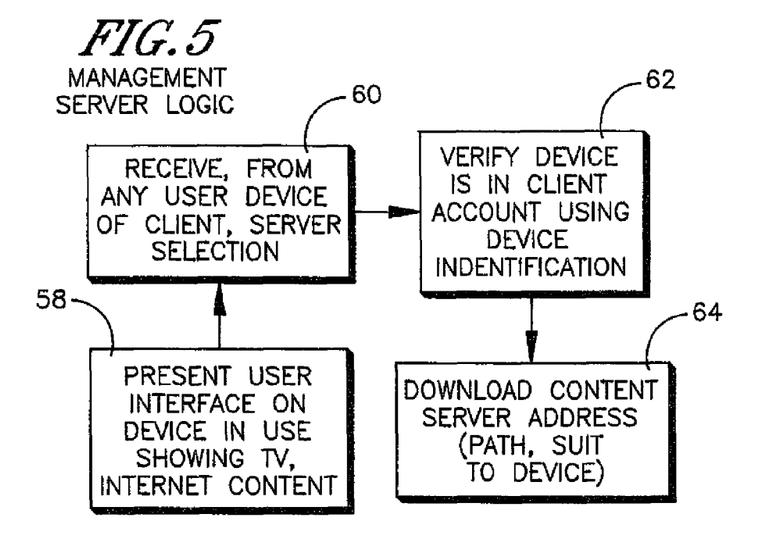
FIG. 5 is a flow chart of example management server logic.

FIG. 5 illustrates example management server 32 logic post-registration when the client device 12 seeks to access content from a content server 34. Commencing at block 58, a user interface is presented on a client device in use indicating that content is available through the TV tuner and the approved content servers (e.g., the service list), one of which sources may be selected by a user of the client device. At block 60, a selection of one of the content servers on the above-described service list is received from the client device along with the user token and the identification of the device. At block 62 the server 32 verifies that the user token is correct and that the identification of the device is authorized as part of the user account and if so, the network path to the requested content server (or its proxy server when one is provided) is downloaded to the requesting device at block 64, along with the SUIT appertaining to the user account that was provided by the content server at block 46 in FIG. 4.

Figure 6:
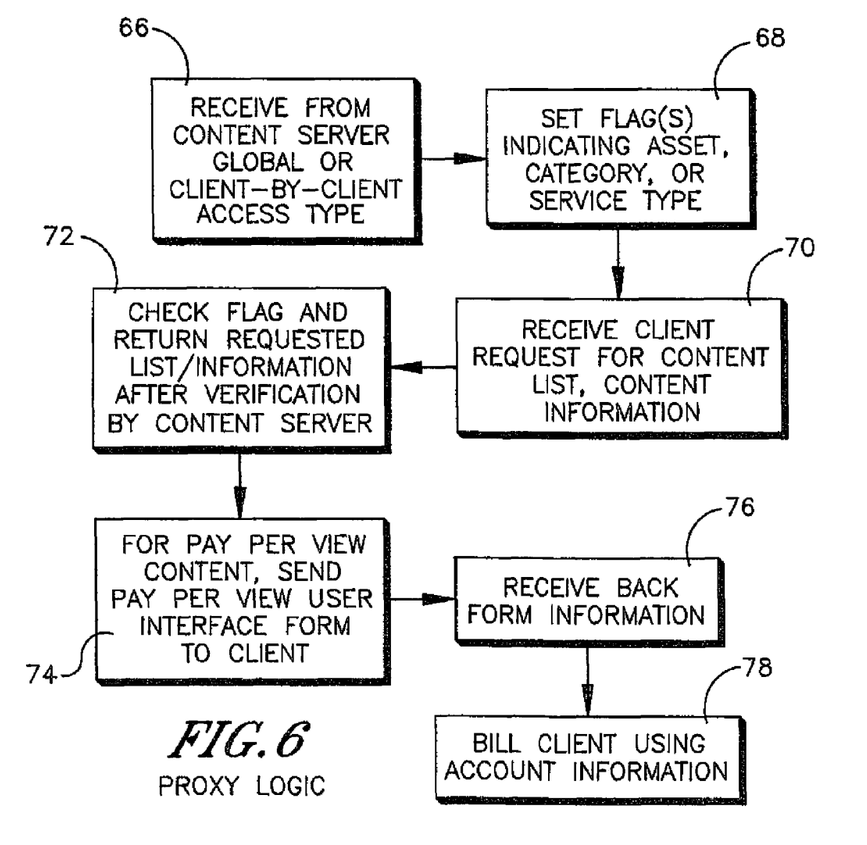
FIG. 6 is a flow chart of example proxy server logic.

The logic of a proxy server 35 that is associated with the selected content server whose network path was provided to the client device at block 64 may be seen in FIG. 6. At block 66 the proxy server receives from its content server or other source affiliated with the entity operating the pair of servers 34/35 a global client access type applicable to all users, or a user-by-user access type. The access type in one implementation is selected from one of three types, namely, access content by content category, by service, or by individual asset (title). Examples of content categories include sports, first run movies, classic movies, cooking shows, weather shows, etc. Examples of services include specific names of Internet-based audio-video service providers which may be accessed through the content server 34. Block 68 indicates that the proxy server 35 sets a flag indicating which access type pertains to each particular user (or when a global access type is implemented, which access type pertains to all users).

Then, at block 70 a client device request for content is received from a client device using the network path provided by the management server at block 64 of FIG. 5. As part of the request the client provides the SUIT originated by the content server 34 which the client device received from the management server in FIG. 5, and it also provides the user token from the management server to indicate that the device is properly enrolled with the management server. The request essentially is in two parts, namely, a request for a content list and a request for information pertaining to the content on the list. The request may be relayed by the proxy server 35 to its associated content server 34.

Block 72 indicates that in response to the client request, assuming the user token indicates that the requesting device is properly enrolled (with the associated content server 34 in some embodiments executing this initial verification), the proxy server 35 uses the SUIT to ascertain the account of the requesting device the proxy server 35. Or, the proxy server 35 may relay the SUIT to the content server 34, which verifies that the SUIT is valid. If either the user token or SUIT is not valid, an error message can be returned to the client device. Token validity may be as simple as verifying that the provided user token/SUIT appears in a table of authorized tokens accessible to the verifying server.

Assuming both the user token and SUIT are valid, the proxy server 35 checks the access type flag associated with the requesting device account. Based on the flag value the content server 34/proxy server 35 assembly returns to the client device 12 the appropriate content list, namely, a list of individual asset titles, a list of approved content categories, or a list of approved services, along with explanatory information regarding the elements of the list.

When the list returned to the client presents PPV asset titles or PPV categories or PPV services and the client selects an element on the list, in response at block 74 a user interface (UI) form is sent to the client device for display thereof. The form may be simply a prompt to verify that the user wishes to access content for which the user will be billed, or it may include a credit card entry field, etc. Regardless, the information from the form as selected or input by the user through the client device is received at block 76. The proxy server 35 may then generate electronic billing information that is provided to the user of the client device using the account information related to the user, or this task may be executed by the content server 34 or other affiliated server.

Figure 7:
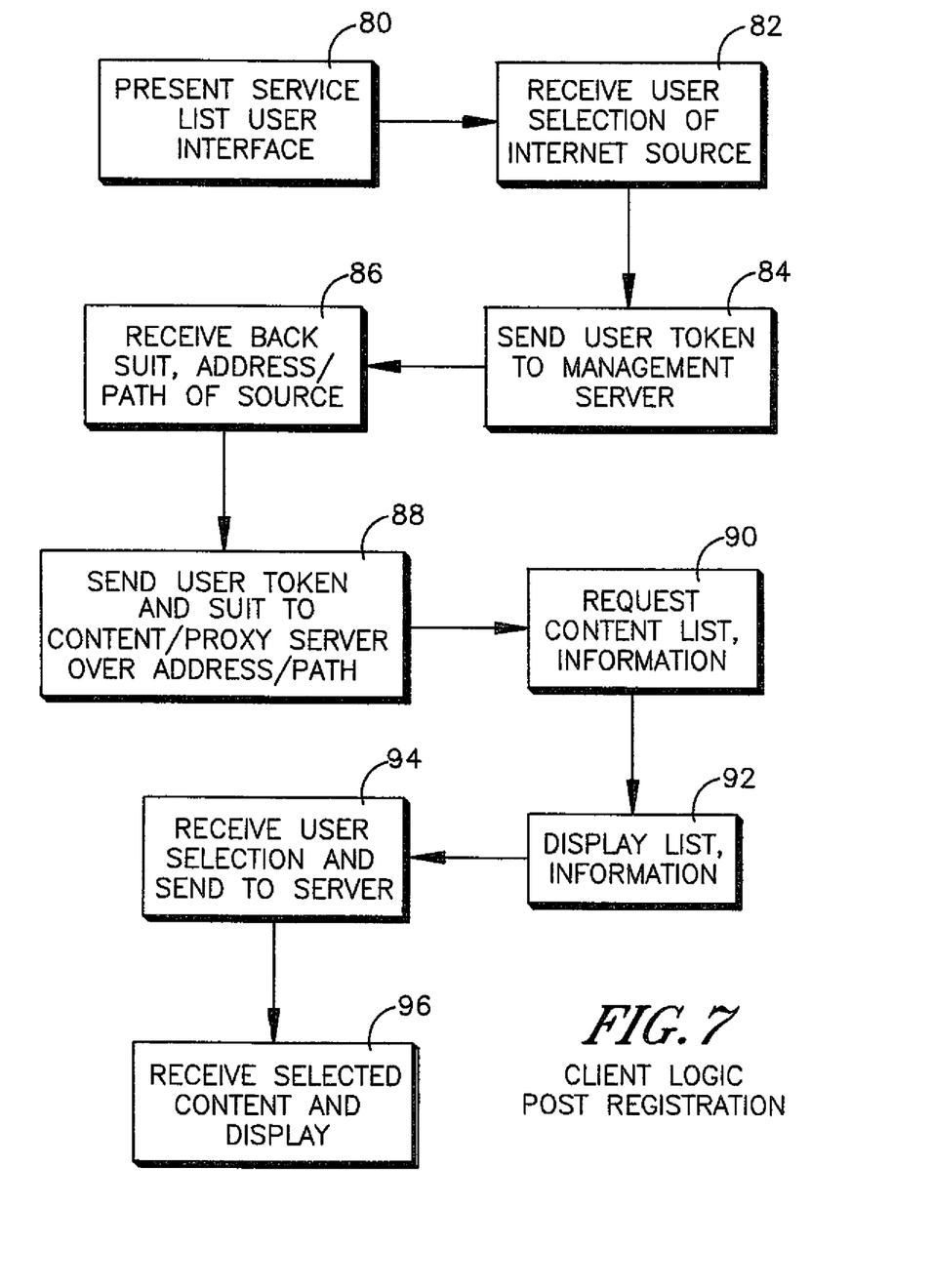
FIG. 7 is a flow chart of example post-registration client logic.

FIG. 7 shows related logic implemented by the client device 12 and can be more easily understood in light of the disclosure above. At block 80 the above-described service list is presented on the display 18 and a user selection of an Internet source on the list is received at block 82 from, e.g., the input device 26. The user token and selection are sent to the management server 32 at block 84. In response, at block 86 the SUIT associated with the selected source and the path to the related content server (proxy server) are received from the management server. Then at block 88 the path is invoked to establish communication with the selected content server (proxy server) and the SUIT and user token provided as described above.

Proceeding to block 90, the client device also requests of the content server (proxy server) the content list and information related thereto. Assuming the user token and SUIT both pass the validity tests mentioned above, at block 92 the requested list and information are presented on the display 18. A user selection of an entry on the list is received at block 94 and sent to the proxy server 35, with the returned content being received and displayed at block 96.

As indicated above, the entity associated with a particular content server 34 can limit access by a user to particular categories, or services, or individual asset titles, with the above-mentioned flag set in the proxy server 35 accordingly. In an example non-limiting embodiment when a client device 12 makes a request for the assets in a specific category an STSgetAuthorization request is made by the proxy server 35 with a parameter type set to "category" and a parameter identifier set to the name of the category, including the hierarchy of its parent categories. In an extended markup language (XML) response, the content server 34 can specify if the client device has authorization to access the requested category. A successful response may contain an authorization tag with a result attribute having a value of "success". In contrast, if the user is not authorized for the category, the result XML can contain an authorization tag with the result attribute having a value of fail. The XML may also contain a form tag, which may contain one background image, one or more message tags to display to the user, and an account registration progress tag to indicate the registration status. The message or one of the messages may contain a placeholder for the registration code. The proxy server 35 can insert the registration code into this placeholder. The message(s) may be localized in the user's language when a language parameter is included in the STSgetAuthorization request.

The above process is substantially the same when the content server 34 sets the access type to "service" or "individual asset title", with the flag being set accordingly and the messages changed to appropriately reflect "service" or "individual asset title".

Below are examples of the messages discussed above by way of illustration and not by way of limitation:

| STSgetAuthorizationRequest | |
|---|---|
| id | Name of a service, fully qualified category name, or ID number of an asset. For a nested category, the semi-colon (;) character is used as the delimiter to indicate parent and child relationship. The top-level parent category's name comes first. Each category name may be encoded before it is used to make the fully qualified name by escaping the backslash characters by repeating them (\ → \\) and replacing the semi-colon characters with a backslash and the character s (; → \s) (string maxlen 37 for asset and service and length of a fully qualified category name varies). |
| service_name | Name of a service and is the same as 'id' if the request type is service (string maximum length (maxlen) 37 for service). |
| provider | Name of a service provider (string maxlen 37). |
| suit | Service User ID Token (SUIT) - A provider-generated value for the identity of the user that is associated with the token request. The possible values are an actual SUIT and NO_SUIT (string maxlen 64). |
| sig | A signature generated on the URL string using an MD5 hash [Error! Reference source not found.] of the portion prior to the '&sig=' concatenated with a secret string value unique to each Service Provider (string). |
| reg_status | Flag indicating whether the client is registered with the entity associated with the management server (string maxlen 5). Possible values are true or false. |
| type | Type of data access requested by the user (service, category, or asset) for authorization (string maxlen 32). |
| request_timestamp | A string containing the date and time that the authorization request was issued (string maxlen 64). |
| Optional fields: | |
| language | User's preferred language as set on the attached television (string maxlen 2). |
| ip_address | Internet location of the IPTV product (string maxlen 32). |
| version | An unsigned integer field indicating the version and/or format of the message structure. If omitted, version 0 is assumed (string maxlen 5). |

Response to STSgetAuthorizationRequest

Two tags are returned along with the command, namely, an authorization tag defining the result of user account verification and a code tag indicating the status of the command.

| tags: | |
|---|---|
| authorization | Defines the result of user account verification with the Service Provider (string maxlen 64). |
| Optional tags: | |
| playlist | A container for the play list information about an asset. |
| asset | A single asset record that groups information regarding the location of the video content be retrieved by the client. This field is not required for service or category GET response, and is not required when the user is not authorized (string maxlen 64). |
| contents | Defines the location of the video content to be retrieved by the client. This field is not required for service or category GET response, and is not required when the user is not authorized (string maxlen 64). |
| speed_check | Defines the location of the media content for link speed check to be retrieved by the client. This field is not required for service or category GET response, and is not required when the user is not authorized (string maxlen 64). |
| source | Defines the URL where the content media is available for a successful asset GET request. This field is not required for service or category GET response, and is not required when the user is not authorized (string maxlen 64). |
| categories | A hierarchy of categories offered by a Service Provider (string maxlen 128). |
| category | A category offered by a Service Provider (string maxlen 128). |
| service | A service offered by a Service Provider (string maxlen 64). |
| form | Defines a background image and a list of text message(s) to be displayed for an unregistered user. |
| message | The command code status meaning for a failed authorization (string maxlen 128). |
| background | Defines a background image to be displayed for a failed authorization. The background image must be PNG type 6, TrueColor, interlace method 0 or JPEG JFIF type. |
| reg_in_progress | Flag indicating user registration is in progress (string maxlen 5). Possible values are true or false. |

While the particular ENABLEMENT OF PREMIUM CONTENT FOR INTERNET VIDEO CLIENT is herein shown and described in detail, it is to be understood that the subject matter which is encompassed by the present invention is limited only by the claims.

What is claimed is:

1. Method comprising:
providing a respective client-unique service user identification token (SUIT) to a management server for each of plural user accounts identified by the management server, the SUIT not being received, by plural user accounts identified by the management server, from the management server prior to being provided to the management server for each of the plural user accounts identified by the management server;
receiving from a client device over a network path obtained by the client device from the management server at least a request for a content list and the SUIT;
determining whether the SUIT is valid; and
at least in part responsive to a determination that the SUIT is valid and only if the SUIT is valid, providing a content list to the client device, wherein the content list is transmitted to the client device only if both the SUIT and a user token received from the client device are valid.

2. The method of claim 1, comprising providing an access type indicator indicating that the client device is authorized to access individual content asset titles.

3. The method of claim 1, comprising originating the user token by a management server to indicate that the client device is properly enrolled with the management server.

4. The method of claim 3, comprising, in response to the request for a content list and a determination that the user token indicates that the client device is properly enrolled, using the SUIT to ascertain an account of the client device.

5. The method of claim 1, comprising verifying that the user token appears in a table of authorized tokens.

6. The method of claim 1, comprising receiving a copy of the user token from the management server.

7. The method of claim 1, comprising transmitting a user interface (UI) form to the client device usable for generating billing information to the account of the client device responsive to receiving a selection of content from the client device.

8. The method of claim 1, comprising presenting pay per view (PPV) entries, each entry representing an individual content asset title available for purchase by the client device.

9. The method of claim 1, comprising originating the SUIT at a content server assembly.

10. The method of claim 1, comprising generating the SUIT at a content server assembly.

11. Computer medium comprising: at least one computer readable storage medium that is not carrier wave and that bears instructions executable by a processor which when executed by the processor configure the processor for:

receiving at client device a client-unique service user identification token (SUIT) from a management server, the SUIT not being received from the management server prior to being provided by the management to the client device;

sending from the client device over a network path obtained by the client device from the management server at least a request for a content list and the SUIT;

at least in part responsive to a determination that the SUIT is valid and only if the SUIT is valid, receiving a content list at the client device, wherein the content list is received by the client device only if both the SUIT and a user token provided by the client device are valid.

12. The computer readable medium of claim 11, wherein the instructions when executed by the processor further configure the processor for receiving a copy of the user token from the management server.

13. The computer readable medium of claim 11, wherein the instructions when executed by the processor further configure the processor for receiving a user interface (UI) form at the client device usable for generating billing information to the account of the client device responsive to receiving a selection of content from the client device.

14. The computer readable medium of claim 11, wherein the instructions when executed by the processor further configure the processor for presenting pay per view (PPV) entries on the client device, each entry representing an individual content asset title available for purchase by the client device.

* * * * *